United States Patent
Fay (10) Patent No.: US 6,667,833 B1
(45) Date of Patent: Dec. 23, 2003

(54) METHOD OF ADJUSTING INTERPUPILLARY DISTANCE IN VIEWING GLASSES AND APPARATUS THEREFOR

(76) Inventor: James B. Fay, 8220 W. Oaklawn Rd., Biloxi, MS (US) 39532

(*) Notice: Subject to any disclaimer, the term of this patent is extended or adjusted under 35 U.S.C. 154(b) by 0 days.

(21) Appl. No.: 10/233,769

(22) Filed: Sep. 3, 2002

(51) Int. Cl.[7] .............................................. G02B 23/00
(52) U.S. Cl. ....................... 359/411; 359/481; 351/158
(58) Field of Search ................................. 359/409, 410, 359/411, 480, 481; 351/57, 59, 158

(56) References Cited

U.S. PATENT DOCUMENTS

| | | | | |
|---|---|---|---|---|
| 1,851,579 A | * | 3/1932 | Hixon | 359/411 |
| 4,364,645 A | * | 12/1982 | Feinbloom | 351/204 |
| 5,090,796 A | * | 2/1992 | Feinbloom | 351/158 |
| 5,291,229 A | * | 3/1994 | Feinbloom | 351/57 |
| 5,381,263 A | * | 1/1995 | Nowak et al. | 359/411 |
| 2002/0131015 A1 | * | 9/2002 | Caplan | 351/124 |

* cited by examiner

*Primary Examiner*—Mark A. Robinson
(74) *Attorney, Agent, or Firm*—Ted Masters (57) ABSTRACT

A method and apparatus for adjusting the interpupillary distance of viewing glasses includes pivotally connected right and left lens holders which fit into right and left eye openings. The edges of the lens holders rest upon the inner surface of the eye openings. As the pivot axis of the right and left lens holders is vertically moved up or down along a slotted throughway in the bridge of the glasses, the lens holders move horizontally inwardly or outwardly to adjust the interpupillary distance. In a preferred embodiment of the invention, the center of the lenses remain at a constant height as they move inwardly and outwardly.

10 Claims, 6 Drawing Sheets

METHOD OF ADJUSTING INTERPUPILLARY DISTANCE IN VIEWING GLASSES AND APPARATUS THEREFOR

TECHNICAL FIELD

The present invention generally pertains to viewing glasses, and more particularly to a method and apparatus for adjusting the interpupillary distance of the glasses.

BACKGROUND OF THE INVENTION

Devices for adjusting the interpupillary distance of glasses are well known in the art. For example, U.S. Pat. No. 385,872 shows binocular glasses. In one embodiment a longitudinal spring and nut arrangement are utilized to adjust the width of the eye tubes. In another embodiment a hinge and pivot construction is employed.

U.S. Pat. No. 1,851,579 illustrates binocular nose glasses. Interpupillary distance adjustment is accomplished by sliding one of the binoculars in a horizontal direction.

U.S. Pat. No. 2,024,322 discloses telescoping goggles. Interpupillary distance adjustment is effected by moving the telescopes closer together or further apart and locking them in place with a screw.

U.S. Pat. No. 2,389,428 comprises a combined spectacle and telescope. Interpupillary distance adjustment is made by moving the lenses to the desired width and locking them in place with a screw.

U.S. Pat. No. 2,935,910 comprises a stereoscopic headband loupe. Lateral adjustment is provided by a turnbuckle member.

U.S. Pat. No. 3,244,072 describes an ocular and objective shutter mechanism for laterally adjustable binoculars. Lens casing are movable from a closed position where they completely envelop the central bridge, to positions where the lens casings are moved transversely outwardly to provide interpupillary distance accommodation.

U.S. Pat. No. 3,914,012 depicts a binocular body for a microscope which permits variation of interpupillary distance without compensating lenses. Variations in interpupillary distance may be accommodated by swinging the eyepiece tubes through in an arch about the optical axis of the instrument.

U.S. Pat. No. 4,284,325 is directed to an eye span adjustment mechanism for binoculars. A pair of guide rails are disposed laterally in the binocular housing. Drive rods threadably engaged with the lens barrels are movable along the guide rails to move the lens barrels back and forth in response to a knob and adjustment rod.

SUMMARY OF THE INVENTION

The present invention is directed to an improved method and apparatus for adjusting the interpupillary distance (sometimes referred to as eye span) in glasses. The glasses of the present invention can be worn at any indoor or outdoor sporting event, nature event, or in any other circumstance where binoculars would be utilized. Alternatively, with a change of lenses, the glasses can be utilized for close up magnification viewing for coin collectors, stamp enthusiast, etc.

In accordance with a preferred embodiment of the invention, a method for adjusting the interpupillary distance of viewing glasses, includes:

(a) providing viewing glasses which include:

a glasses-type frame having a right eye opening, a left eye opening, and a bridge portion disposed therebetween;

right eye opening and left eye opening each having an inner surface;

bridge portion having a vertical slotted throughway;

a right lens holder is pivotally connected to a left lens holder at a pivot axis, the right and left lens holders each having a peripheral edge;

pivot axis slidably engages the vertical slotted throughway;

right and left lens holders are shaped and dimensioned to fit into right and left eye openings respectively, wherein the peripheral edge of the right lens holder contacts the inner surface of the right eye opening, and the peripheral edge of the left lens holder contacts the inner surface of the left eye opening;

a locking mechanism for selectively (1) locking the right lens holder and the left lens holder in fixed pivoted relationship, and (2) releasing the right and left lens holders so that the right and left lens holders may freely pivot with respect to one another; and;

(b) releasing the locking mechanism;

(c) moving the pivot axis up or down in a vertical direction along slotted throughway, thereby causing the peripheral edges of the right and left lens holders to ride horizontally inwardly or outwardly along the inner surface of the right and left eye openings respectively thereby adjusting the interpupillary distance of the viewing glasses to a desired setting; and, (d) locking the locking mechanism to retain the right and left lens holders in a fixed pivoted relationship.

In accordance with an aspect of the invention, the right and left eye openings each have a straight horizontal portion. A circular portion of the edges of the right and left lens holders rides on the straight portion, thereby keeping the center of the lens a constant height above the straight portion of the frame. This feature makes it unnecessary for a user to move the viewing glasses up or down as the interpupillary distance is changed.

In accordance with a aspect of the invention, the method further including:

in step (a) the locking mechanism further including:
the pivot axis including a sleeve which is disposed on one of the right lens holder and the left lens holder;
sleeve having a threaded rear portion;
the other of the right lens holder and the left lens holder having a hole which receives the sleeve; and,
an adjustment screw which abuts the bridge portion, passes through the sleeve, and engages the threaded rear portion.

Other aspects of the present invention will become apparent from the following detailed description, taken in conjunction with the accompanying drawings, which illustrate, by way of example, the principles of the invention.

DETAILED DESCRIPTION OF THE INVENTION

Figure 1:
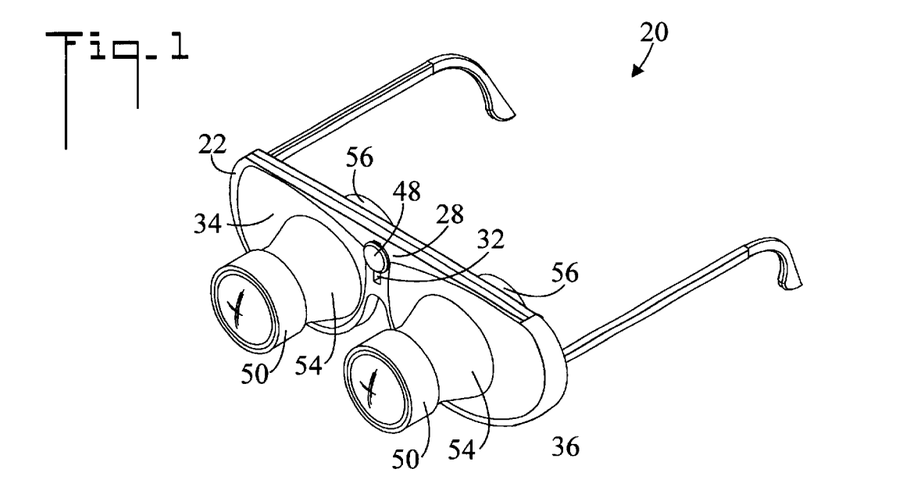
FIG. 1 is a perspective view of viewing glasses having an interpupillary distance adjustment in accordance with the present invention.
Figure 2:
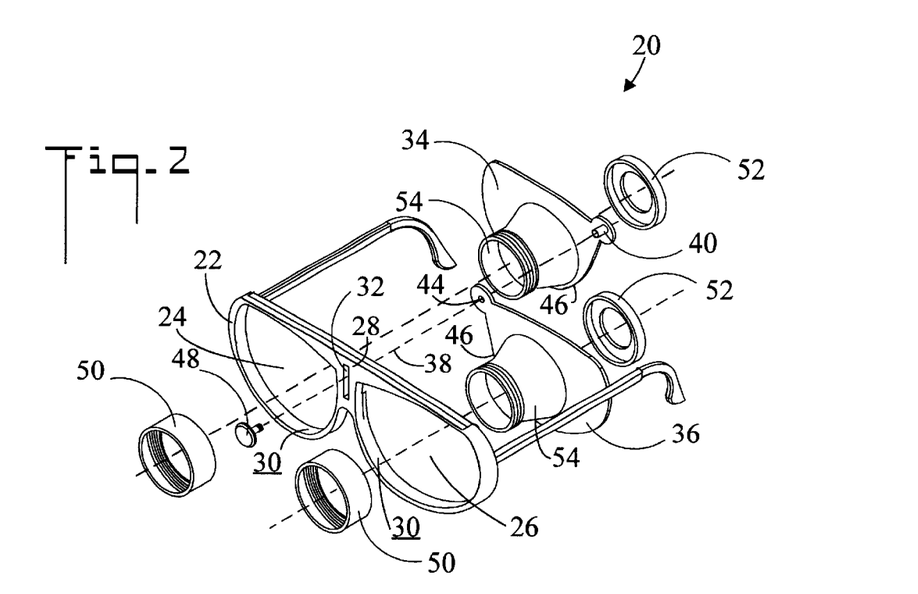
FIG. 2 is an exploded perspective view of the viewing glasses.

Referring initially to FIGS. 1 and 2, there are illustrated perspective and exploded perspective view respectively of viewing glasses having an interpupillary distance adjustment in accordance with the present invention, generally designated as 20. Viewing glasses 20 include a frame 22 having a right eye opening 24, a left eye opening 26, and a bridge portion 28 disposed therebetween. Right eye opening 22 and left eye opening 24 each having an inner surface 30. Bridge portion 28 has a vertical slotted throughway 32. A right lens holder 34 is pivotally connected to a left lens holder 36 at a pivot axis 38. Pivot axis 38 includes a sleeve 40 which is disposed on one of the right lens holder 34 and the left lens holder 36 (on the right lens holder in the shown embodiment). Sleeve 40 has a threaded rear portion 42 (also refer to FIGS. 4 and 8). The other of the right lens holder 34 and the left lens holder 36 (the left lens holder in the shown embodiment) has a hole 44 which receives sleeve 40 so that the right 34 and left 36 lens holders may pivot about sleeve 40. Pivot axis 38 in the form of sleeve 40 slidably engages vertical slotted throughway 32, so that sleeve 40 may be moved up and down in vertical slotted throughway 32. Right 34 and left 36 lens holders each having a peripheral edge 46 (refer also to FIGS. 5–7). Right 34 and left 36 lens holders are shaped and dimensioned to fit into right 24 and left 26 eye openings respectively, wherein the peripheral edge 46 of the right lens holder 34 contacts the inner surface 30 of right eye opening 24, and the peripheral edge 46 of the left lens holder 36 contacts the inner surface 30 of the left eye opening 26.

Viewing glasses 20 further include a locking mechanism for selectively (1) locking the right lens holder 34 and the left lens holder 36 in fixed pivoted relationship, and (2) releasing the right 34 and left 36 lens holders so that the right 34 and left 36 lens holders may freely pivot with respect to one another. The locking mechanism includes an adjustment screw 48 which abuts bridge portion 28, passes through sleeve 40, and engages threaded rear portion 42 of sleeve 40 (refer also to FIG. 9). When the locking mechanism is released (loosened) and the pivot axis 38 (sleeve 40) is moved up or down in a vertical direction along slotted throughway 32, the peripheral edges 46 of right 34 and left 36 lens holders ride horizontally inwardly or outwardly along the inner surface 30 of right 24 and left 26 eye openings respectively thereby adjusting the interpupillary distance of viewing glasses 20 (also refer to FIGS. 5–7). When the desired interpupillary distance is achieved, the locking mechanism is locked (tightened) to hold the right 34 and left 36 lens holders in a fixed pivoted relationship.

Right 34 and left 36 lens holders each contain an adjustable lens housing 50 and a fixed lens housing 52. The adjustable lens housing 50 is carried by adjustable lens container 54, and the fixed lens housing 52 is carried by fixed lens container 56.

Figure 3:
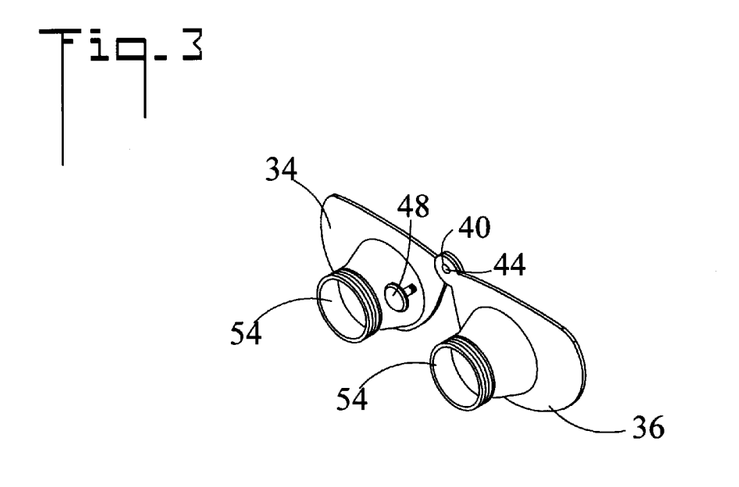
FIG. 3 is a perspective view of right and left lens holders.

FIG. 3 is a perspective view of right 34 and left 36 lens holders. Also referring to FIG. 2, hole 44 in left lens holder 36 receives sleeve 40 which is attached to right lens holder 34. After passing through vertical slotted throughway 32, adjustment screw 48 passes though sleeve 40 and engages threaded portion 42, thereby holding right 34 and left 36 lens holders together in pivoted relationship.

Figure 4:
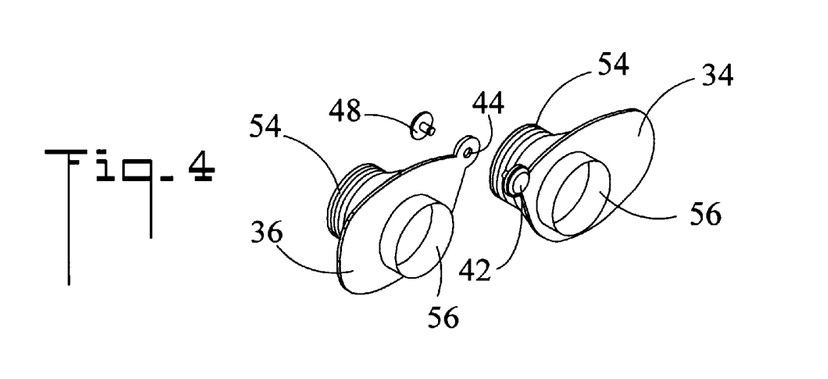
FIG. 4 is a reverse perspective view of the right and left lens holders.

FIG. 4 is a reverse perspective view of the right 34 and left 36 lens holders, showing threaded portion 42 and fixed lens containers 56.

Figure 5:
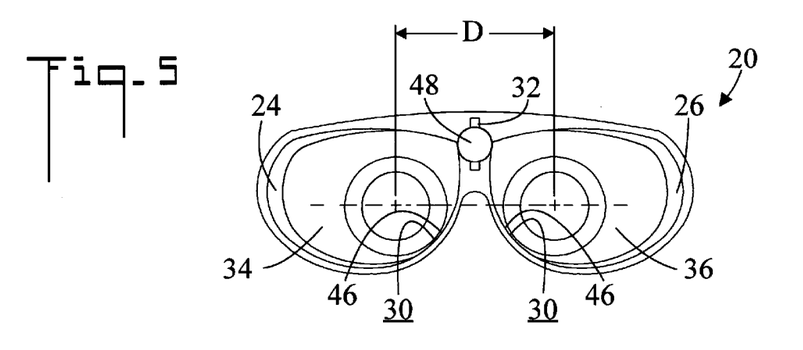
FIG. 5 is a front elevation view of the viewing glasses adjusted to a mid interpupillary distance.
Figure 6:
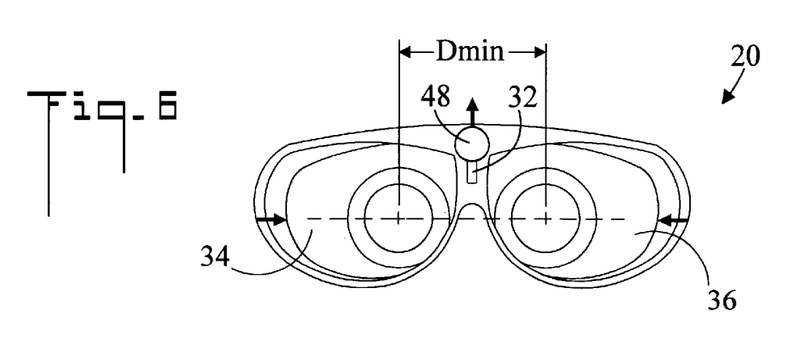
FIG. 6 is a front elevation view of the viewing glasses adjusted to a minimum interpupillary distance.
Figure 7:
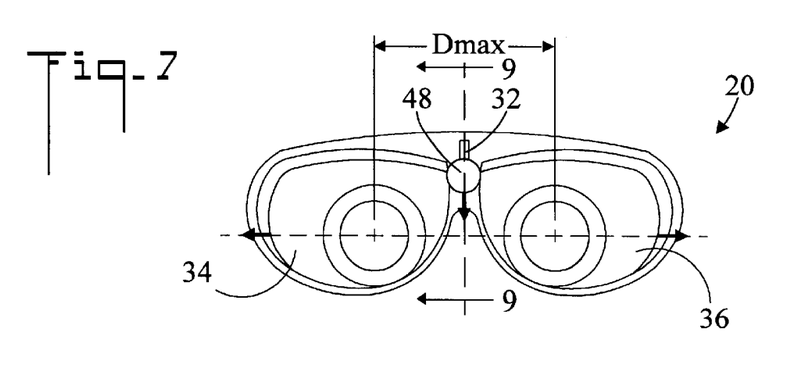
FIG. 7 is a front elevation view of the viewing glassed adjusted to a maximum interpupillary distance.

FIG. 5–7 depict the interpupillary adjustment feature of the present invention. FIG. 5 is a front elevation view of viewing glasses 20 adjusted to a mid interpupillary distance. FIG. 6 is a front elevation view of viewing glasses 20 adjusted to a minimum interpupillary distance. And, FIG. 7 is a front elevation view of viewing 20 glasses adjusted to a maximum interpupillary distance. In FIG. 5, adjustment screw 48 has been position to a mid position along slotted throughway 32. This position causes right 34 and left 36 lens holders to move horizontally to a mid interpupillary distance D. It is noted that peripheral edges 46 of right 34 and left 36 lens holders ride along the inner surface 30 of the eye openings 24 and 26 respectively. In FIG. 6, adjustment screw 48 has been positioned to an uppermost location along slotted throughway 32. This position causes right 34 and left 36 lens holders to move horizontally inward to a minimum interpupillary distance (Dmin). Again, edges 46 ride along inner surface 30. In FIG. 7, adjustment screw 48 has been positioned a lowermost location along slotted throughway 32. This position causes right 34 and left 36 lens holders to move horizontally outward to a maximum interpupillary distance (Dmax). Again, edges 46 ride along inner surface 30.

Figure 8:
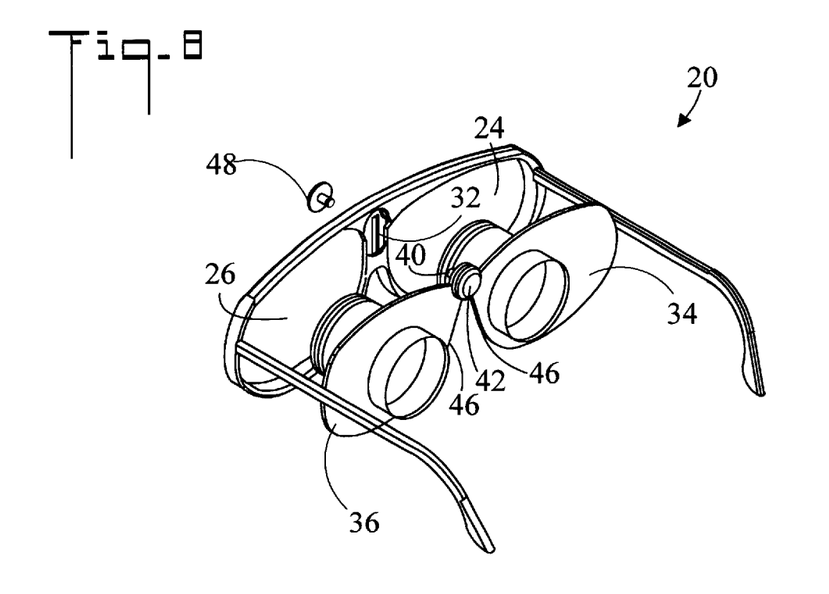
FIG. 8 is a reverse exploded perspective view of the viewing glasses.

FIG. 8 is a reverse exploded perspective view of viewing glasses 20, showing how right 34 and left 36 lens holders fit into right 24 and left 26 eye openings, and are retained by adjustment screw 48.

Figure 9:
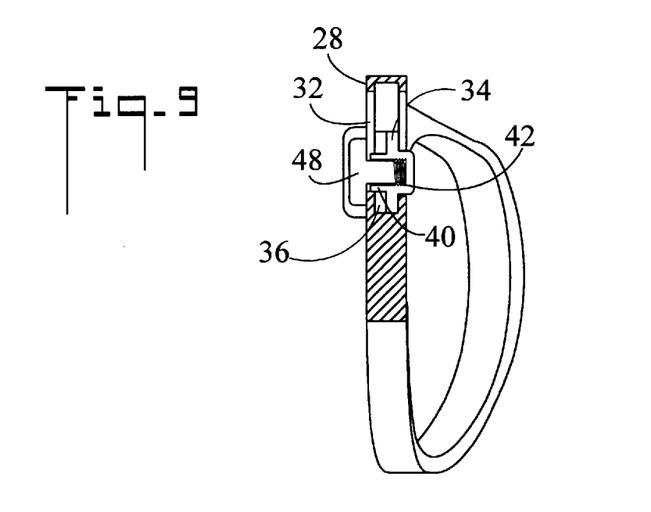
FIG. 9 is an enlarged cross sectional view along the line 9—9 of FIG. 7.

FIG. 9 is an enlarged cross sectional view along the line 9—9 of FIG. 7. Adjustment screw 48 engages threaded portion 42 of right lens holder 34. Bridge portion 28, left lens holder 36, and right lens holder 34 are sandwiched between adjustment screw 48 and threaded portion 42. When adjustment screw 48 is tightened in a clockwise direction, right 34 and left 36 lens holders are locked together in a fixed pivoted relationship. When adjustment screw 48 is released (loosened) in a counterclockwise direction, left lens holders 36 is free to pivot about sleeve 40 which comprises pivot axis 38.

Figure 10:
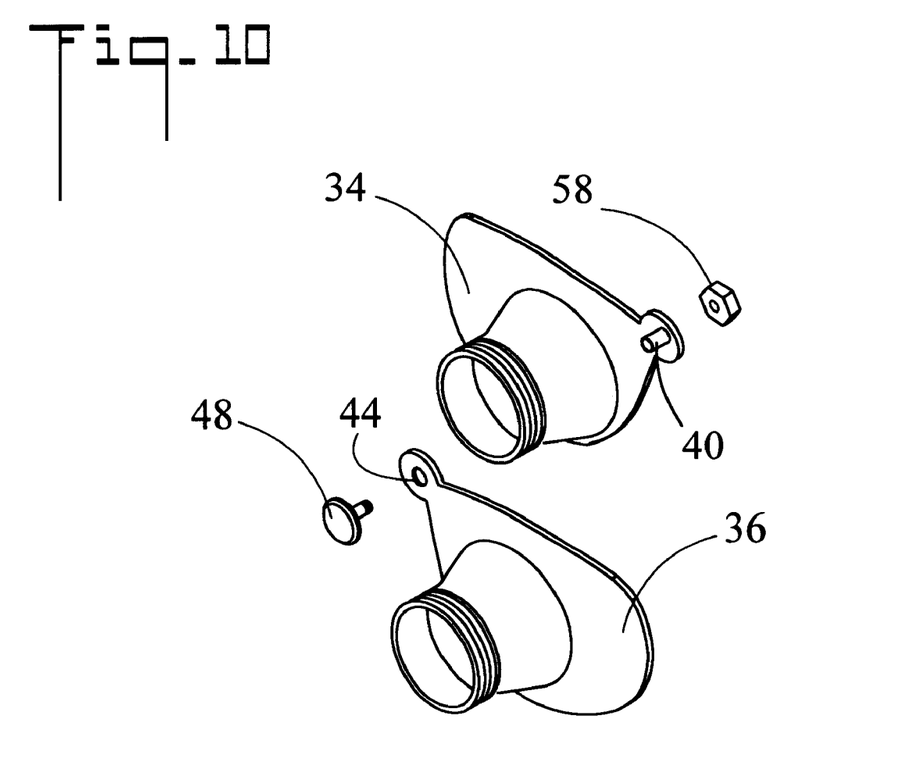
FIG. 10 is an exploded perspective view of an alternative lens holder embodiment.

FIG. 10 is a perspective view of an alternative lens holder embodiment. In this embodiment sleeve 40 does not contain a threaded portion. Rather a nut 58 is used to engage adjustment screw 48 and retain first 34 and second 36 lens holders.

Figure 11:
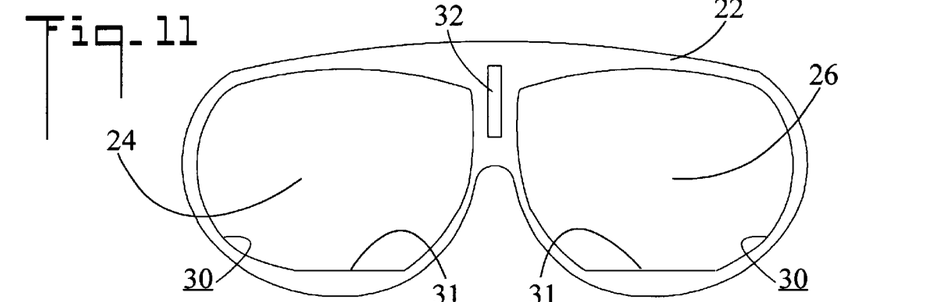
FIG. 11 is an enlarged front elevation view of a frame having a straight inner surface.
Figure 12:
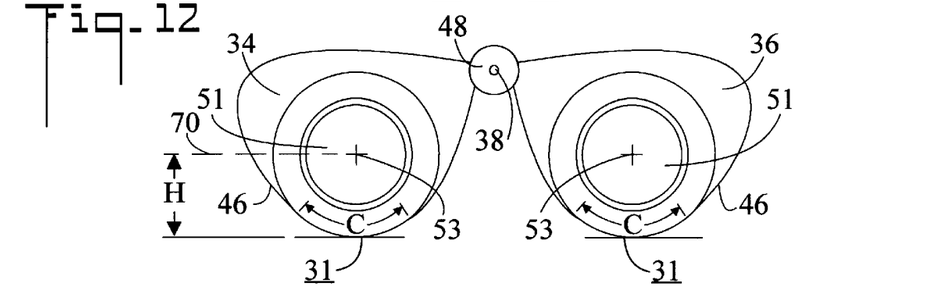
FIG. 12 is an enlarged front elevation view of the lens holder engaging the straight inner surface at a mid interpupillary distance.

Now referring to FIGS. 11 and 12 there is illustrated an enlarged front elevation view of a frame 22 having a straight inner surface, and enlarged front elevation view of right 34 and left 36 lens holders adjusted for a mid interpupillary distance. The frame 22 and the lens holders 34 and 36 are separated for clarity. Inner surface 30 of right eye 24 and left eye opening 26 each have a horizontal straight portion 31. Right 34 and left 36 lens holders each carry a lens 51 having a center 53. The peripheral edges 46 of the right 34 and left 36 lens holders having a circular portion C all points of which are equidistant from the center of lens 51. When pivot axis 38 is moved up or down in a vertical direction along said slotted throughway 32, circular portion C rides horizontally inwardly or outwardly along straight portion 31, so that the center 53 of lens 51 remains a constant height H above straight portion 31. In this fashion, as the interpupillary distance is changed a user does not have to adjust viewing glasses 20 up or down to center the lens 51 on the eye.

Figure 13:
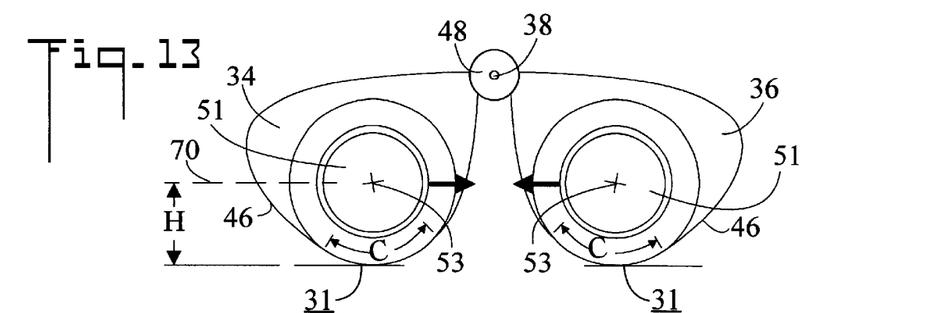
FIG. 13 is an enlarged front elevation view of the lens holder engaging the straight inner surface at a minimum interpupillary distance; and, FIG. 14 is an enlarged front elevation view of the lens holder engaging the straight inner surface at a maximum interpupillary distance.

FIG. 13 is an enlarged front elevation view of the lens holders 34 and 36 engaging the straight inner surface 31 at a minimum interpupillary distance.

Figure 14:
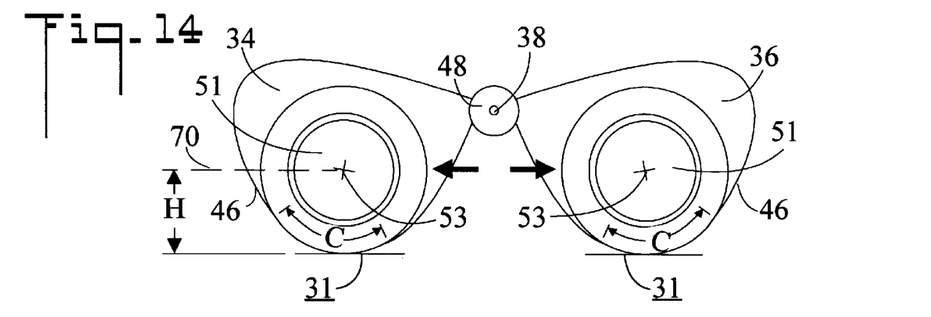

FIG. 14 is an enlarged front elevation view of the lens holders 34 and 36 engaging the straight inner surface 31 at a maximum interpupillary distance.

In terms of use, a method for adjusting the interpupillary distance of viewing glasses 20, includes:

(a) providing viewing glasses 20, the glasses including:
  a frame 22 having a right eye opening 24, a left eye opening 26, and a bridge portion 28 disposed therebetween;
  right eye opening 24 and left eye opening 26 each having an inner surface 30;
  bridge portion 28 has a vertical slotted throughway 32;
  a right lens holder 34 is pivotally connected to a left lens holder 36 at a pivot axis 38, the right 34 and left 36 lens holders each having a peripheral edge 46;
  pivot axis 38 slidably engages vertical slotted throughway 32;
  right 34 and left 36 lens holders are shaped and dimensioned to fit into right 24 and left 26 eye openings respectively, wherein the peripheral edge 46 of the right lens holder 34 contacts the inner surface 30 of the right eye opening 24, and the peripheral edge 46 of the left lens holder 36 contacts the inner surface 30 of the left eye opening 26;
  a locking mechanism for selectively (1) locking right lens holder 34 and left lens holder 36 in fixed pivoted relationship, and (2) releasing right 34 and left 36 lens holders so that right 34 and left 36 lens holders may freely pivot with respect to one another; and;
(b) releasing the locking mechanism;
(c) moving the pivot axis 38 up or down in a vertical direction along slotted throughway 32, thereby causing peripheral edges 46 of right 34 and left 36 lens holders to ride horizontally inwardly or outwardly along inner surface 30 of right 24 and left 26 eye openings respectively thereby adjusting the interpupillary distance of viewing glasses 20 to a desired setting; and,
(d) locking the locking mechanism to retain the right 34 and left 36 lens holders in a fixed pivoted relationship.

The method further including:
in step (a), the viewing glasses 20 further including:
  the inner surface 30 of right eye opening 24 and left eye opening 26 each having a straight portion 31;
  the right 34 and left 36 lens holders each carrying a lens 51 having a center 53;
  the peripheral edges 46 of right 34 and left 36 lens holders having a circular portion C all points of which are equidistant from center 53 of lens 51; and, so that in step (c), when pivot axis 38 is moved up or down in a vertical direction along slotted throughway 32, the circular portion C rides horizontally inwardly or outwardly along straight portion 31, so that center 53 of lens 51 remains a constant height H above straight portion 31.

The method further including:
in step (a) the locking mechanism further including:
  the pivot axis 38 including a sleeve 40 which is disposed on one of right lens holder 34 and left lens holder 36;
  sleeve 40 having a threaded rear portion;
  the other of the right lens holder 34 and left lens holder 36 having a hole 44 which receives sleeve 40; and,
  an adjustment screw 48 which abuts bridge portion 28, passes through sleeve 40, and engages threaded rear portion 42.

The method further including:
in step (a) the locking mechanism further including:
  pivot axis 38 including a sleeve 40 disposed on one of right lens holder 34 and left lens holder 36;
  a nut 58;
  the other of right lens holder 34 and left lens holder 36 having a hole 44 which receives sleeve 40; and,
  an adjustment screw 48 which abuts bridge portion 28, passes through sleeve 40, and engages nut 58.

The method further including:
right 34 and left 36 lens holders each containing an adjustable lens and a fixed lens.

The preferred embodiments of the invention described herein are exemplary and numerous modifications, variations, and rearrangements can be readily envisioned to achieve an equivalent result, all of which are intended to be embraced within the scope of the appended claims.

I claim:

1. A method for adjusting the interpupillary distance of viewing glasses, comprising:
  (a) providing said viewing glasses, including:
    a frame having a right eye opening, a left eye opening, and a bridge portion disposed therebetween;
    said right eye opening and said left eye opening each having an inner surface;
    said bridge portion having a vertical slotted throughway;
    a right lens holder pivotally connected to a left lens holder at a pivot axis, said right and left lens holders each having a peripheral edge;
    said pivot axis slidably engaging said vertical slotted throughway;
    said right and left lens holders shaped and dimensioned to fit into said right and left eye openings respectively, wherein said peripheral edge of said right lens holder contacts said inner surface of said right eye opening, and said peripheral edge of said left lens holder contacts said inner surface of said left eye opening;
    a locking mechanism for selectively (1) locking said right lens holder and said left lens holder in fixed pivoted relationship, and (2) releasing said right and left lens holders so that said right and left lens holders may freely pivot with respect to one another; and;
  (b) releasing said locking mechanism;
  (c) moving said pivot axis up or down in a vertical direction along said slotted throughway, thereby causing said peripheral edges of said right and left lens holders to ride horizontally inwardly or outwardly along said inner surface of said right and left eye openings respectively thereby adjusting the interpupillary distance of said viewing glasses to a desired setting; and, (d) locking said locking mechanism to retain said right and left lens holders in a fixed pivoted relationship.

2. The method of claim 1, further including:
 in step (a), said viewing glasses further including:
  said inner surface of said right eye opening and said left eye opening each having a straight portion;
  said right and left lens holders each carrying a lens having a center;
  said peripheral edges of said right and left lens holders having a circular portion all points of which are equidistant from said center of said lens; and,
 in step (c), when said pivot axis is moved up or down in a vertical direction along said slotted throughway, said circular portion riding horizontally inwardly or outwardly along said straight portion, so that said center of said lens remains a constant height above said straight portion.

3. The method of claim 1, further including:
 in step (a) said locking mechanism further including:
  said pivot axis including a sleeve disposed on one of said right lens holder and said left lens holder;
  said sleeve having a threaded rear portion;
  said the other of said right lens holder and said left lens holder having a hole which receives said sleeve; and,
  an adjustment screw which abuts said bridge portion, passes through said sleeve, and engages said threaded rear portion.

4. The method of claim 1, further including:
 in step (a) said locking mechanism further including:
  said pivot axis including a sleeve disposed on one of said right lens holder and said left lens holder;
  a nut;
  said the other of said right lens holder and said left lens holder having a hole which receives said sleeve; and,
  an adjustment screw which abuts said bridge portion, passes through said sleeve, and engages said nut.

5. The method of claim 1, further including:
 said right and left lens holders each containing an adjustable lens and a fixed lens.

6. Viewing glasses having an interpupillary distance adjustment, comprising:
 a frame having a right eye opening, a left eye opening, and a bridge portion disposed therebetween;
 said right eye opening and said left eye opening each having an inner surface;
 said bridge portion having a vertical slotted throughway;
 a right lens holder pivotally connected to a left lens holder at a pivot axis, said right and left lens holders each having a peripheral edge;
 said pivot axis slidably engaging said vertical slotted throughway;
 said right and left lens holders shaped and dimensioned to fit into said right and left eye openings respectively, wherein said peripheral edge of said right lens holder contacts said inner surface of said right eye opening, and said peripheral edge of said left lens holder contacts said inner surface of said left eye opening;
 a locking mechanism for selectively (1) locking said right lens holder and said left lens holder in fixed pivoted relationship, and (2) releasing said right and left lens holders so that said right and left lens holders may freely pivot with respect to one another; and,
 so that when said locking mechanism is released and said pivot axis is moved up or down in a vertical direction along said slotted throughway, said peripheral edges of said right and left lens holders ride horizontally inwardly or outwardly along said inner surface of said right and left eye openings respectively thereby adjusting the interpupillary distance of said viewing glasses.

7. Viewing glasses according to claim 6, further including:
 said inner surface of said right eye opening and said left eye opening each having a straight portion;
 said right and left lens holders each carrying a lens having a center;
 said peripheral edges of said right and left lens holders having a circular portion all points of which are equidistant from said center of said lens; and,
 when said pivot axis is moved up or down in a vertical direction along said slotted throughway, said circular portion riding horizontally inwardly or outwardly along said straight portion, so that said center of said lens remains a constant height above said straight portion.

8. Viewing glasses according to claim 6, said locking mechanism further including:
 said pivot axis including a sleeve disposed on one of said right lens holder and said left lens holder;
 said sleeve having a threaded rear portion;
 said the other of said right lens holder and said left lens holder having a hole which receives said sleeve; and,
 an adjustment screw which abuts said bridge portion, passes through said sleeve, and engages said threaded rear portion.

9. Viewing glasses according to claim 6, said locking mechanism further including:
 said pivot axis including a sleeve disposed on one of said right lens holder and said left lens holder;
 a nut;
 said the other of said right lens holder and said left lens holder having a hole which receives said sleeve; and,
 an adjustment screw which abuts said bridge portion, passes through said sleeve, and engages said nut.

10. Viewing glasses according to claim 6, further including:
 said right and left lens holders each containing an adjustable lens and a fixed lens.

* * * * *